Figure 1:
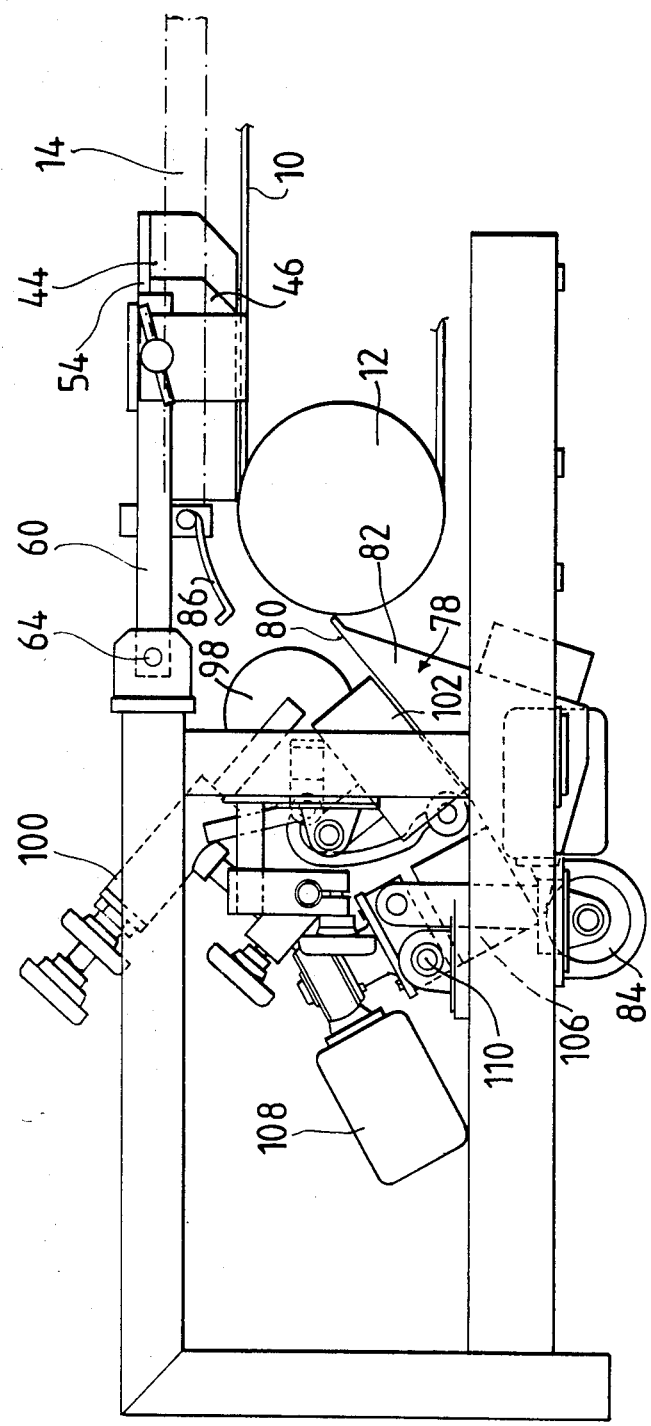

United States Patent [19]

Pivonka

[11] Patent Number: 4,634,363
[45] Date of Patent: Jan. 6, 1987

[54] APPARATUS FOR SLITTING AND FOLDING DOUGH PIECES

[75] Inventor: Josef K. Pivonka, Hingham, England

[73] Assignee: Tweedy of Burnley Limited, Burnley, England

[21] Appl. No.: 765,349

[22] Filed: Aug. 13, 1985

[30] Foreign Application Priority Data

Aug. 16, 1984 [GB] United Kingdom ............... 8420829

[51] Int. Cl.⁴ .................................................. A21C 11/12
[52] U.S. Cl. ..................................... 425/306; 425/373; 425/392; 425/404
[58] Field of Search ............... 425/202, 204, 289, 296, 425/302.1, 305.1, 314, 319, 320, 321, 322, 335, 337, 363, 373, 383, 391, 392, 400, 306, 404, 364 R, 367

[56] References Cited

U.S. PATENT DOCUMENTS

1,126,606  1/1916  Wolf ..................................... 425/364
2,856,869  10/1958  Fram et al. .......................... 425/364

Primary Examiner—Willard E. Hoag
Attorney, Agent, or Firm—Richard E. Jenkins

[57] ABSTRACT

Apparatus for slitting and folding dough for cross-panning of the dough piece. One or more incisions are made in the dough piece so that it can be folded, and according to the method of the invention, after the incisions have been formed, the dough piece travels to the dough folding station between a moving element and a stationary control member (which may be a spring loaded control plate) so that the dough piece is forced to turn about its longitudinal axis. The length of this control movement is so arranged that the angular displacement of the dough piece causes the dough hinge or hinges to be in a desired orientation when the dough piece arrives at the folding station. In W-folding the center dough hinge is displaced from the side dough hinges by 180°, and the method and apparatus ensures that the dough piece is presented to the dough folding arrangement with the side dough hinges on the leading side of the dough piece.

9 Claims, 6 Drawing Figures

APPARATUS FOR SLITTING AND FOLDING DOUGH PIECES

The present invention relates to the moulding of baker's dough, and more particularly to the moulding process which is usually accomplished on a moulder/panner machine, after the dough has been divided into pieces, each of which is to constitute a finished article (e.g. a loaf) and before the dough pieces are placed in baking tins.

A typical moulder/panner as used in a bakery essentially comprises: a sheeting head, wherein divided pieces of dough are received and rolled into sheet form; a coiler, wherein the sheets of dough are coiled upon themselves into rolls, and a panner, wherein the dough rolls are fed into bread tins before proceeding to the oven. The coiler itself generally takes the form of belt conveyor with a chain mail sheet overlying the conveyor at the front end of the conveyor where the dough sheet has just left the sheeting rollers, for the purpose of loosely coiling the dough sheet issuing from the sheeting rollers on itself. It is usually necessary to consolidate the coiled cylinder of dough, and a commonly used consolidator comprises a pressure board spaced closely above the top run of the conveyor. As the coiled dough piece travels under the pressure board, it is caused to rotate by engagement with the pressure board, to tighten the coiling of the dough piece and form a consolidated roll of dough.

Dough moulder/panners are sometimes adapted to produce cross-panning of the dough, that is to say, the cylindrical dough piece is divided into two or more equal lengths, which are then each turned through approximately 90°, so that they lie side-by-side instead of end-to-end, and then these small dough pieces are compressed laterally and dropped into the bread tin, so that the length of each separate dough piece extends across the width of the tin, and the several pieces become united in a single mass of dough. Perhaps the most common form of cross-panning is W-folding, in which the cylindrical dough piece is partly severed to form dough hinges at three positions spaced to divide the dough piece into four equal length short dough pieces; the cylinder of dough is then retarded at the centre of its length (which coincides with the middle dough hinge) so that it forms a V-shape; then the dough piece is retarded at its two ends, so that it adopts a W-shape, and finally the dough piece is compressed inwardly so that the W closes on itself. It is to be understood however that W-folding is only one possibility and that other methods are possible (e.g. a single severing at the centre would produce V-folding and more complicated folding could be achieved with more than three dough hinges).

For the purpose of cross panning, the moulder/panner is provided with one or more stationary blades located over the top run of the conveyor, so that as the dough piece passes in engagement with such a blade, a deep incision is made in the dough piece, whereby a dough hinge is formed between the two smaller pieces of dough on each side of the incision. The subsequent folding is brought about by causing the dough piece to engage with manipulators on the machine. Now one of the problems of the known cross-panning adaptations of a moulder/panner is that the dough hinges may not be properly orientated relatively to the manipulators. Taking the common W-folding adaptation for instance, the middle dough hinge should ideally be at the front of the dough piece when the latter is retarded at the middle hinge position, but the other two dough hinges should be at the rear of the dough piece. It is known to offset the blades with respect to each other to produce angular displacement of the dough hinges around the longitudinal axis of the dough piece, but there is no means of ensuring that these hinges are correctly orientated at the dough folding position on the machine.

The primary object of the present invention is to ensure the correct orientation of the dough hinge or hinges at the folding position. Correct presentation of the dough piece at the folding position is important not only to facilitate the folding operation, but also to avoid distorting the dough. The risk of distorting the dough has increased with the advent of softer doughs containing relative high quantities of water; liquid fats and liquid sugar (glucose) because these doughs are soft and tacky, and readily adhere to any part of the machine which they contact. Furthermore, the softness of the high moisture content dough means that they are easily deformed on impact of any kind. On the other hand, bakeries require a high degree of consistency in the shape of the finished product, so that avoidance of distortion at the dough moulding and panning stage is a primary requirement.

Besides providing an improved method, the invention also relates to apparatus for carrying out the method, particularly in the context of a dough moulding machine.

According to a first aspect of this invention a method of folding an elongate dough piece on a dough moulding machine comprises the steps of: making one or more incisions in the dough piece to form one or more dough hinges between the two pieces of dough on opposite sides of each incision; conveying the dough piece with the dough hinge or hinges to a dough folding station and controlling the dough piece as it travels to the dough folding station between a moving element and a stationary control member, so that the dough piece is caused to turn about its longitudinal axis, the length of this controlled movement being so arranged that the angular displacement of the dough piece causes the dough hinge or hinges to be in a desired orientation when the dough piece arrives at the folding station.

In the preferred method, the dough piece is caused to travel towards the folding station over a roller, and the stationary control member has a control surface curved about an axis parallel with and either coaxial with or adjacent to the axis of the roller. It is further preferred that the control member is resiliently urged towards an optimum control position, so that it is capable of yielding to accommodate some irregularities in the shape of the dough piece.

According to a preferred feature of this aspect of the invention, each incision in the dough piece is made by passing the dough piece in engagement with a blade as the dough piece is carried forward on a conveyor and in engagement with a consolidator, in a manner such that the blade produces a deep incision in the dough piece thereby forming a dough hinge between the dough portions on opposite sides of the incision. Preferably, three such dough hinges are formed by a set of three blades dividing the dough piece into four substantially equal length portions, so that the dough piece can be folded on itself in W-fashion. It is further preferred that the two side dough hinges are disposed substantially diametrically opposite the centre dough hinge, having regard to the longitudinal axis of the dough piece, which at the position of the blades, is arranged transversely of the machine. Moreover, it is preferred to discharge the dough piece from the rear end of the consolidator with the side dough hinges on the trailing side of the dough piece. This also facilitates folding of the dough piece in a W-fashion.

According to a second aspect of the invention, a bakery dough moulder has a conveyor for carrying the dough pieces towards a discharge end of the machine, a blade or blades each adapted to make an incision in a dough piece as it travels on the conveyor, to form one or more dough hinges in the dough piece; a moving element for conveying a dough piece after it has been engaged by the blade or blades to a dough folding station and a stationary control member disposed over the path of the moving element so that it has a control surface which engages with the dough piece as the latter is travelling on the moving element, the length of this control surface being such that the dough piece it caused to turn through an angle about its own longitudinal axis which causes the dough hinge or hinges to be in the desired orientation at the folding station.

In the preferred construction, the moving element comprises a roller, but it may also comprise a part of the the conveyor which passes over a roller, in which case that roller is preferably a guide roller for the conveyor at the discharge end of the conveyor. Preferably the stationary control member comprises a control plate located above the guide roller and curved about an axis parallel with and either coaxial with or adjacent to the axis of the guide roller, to form a curved nip between the guide roller or part of the conveyor belt passing over the guide roller and the underside of the control plate. The control plate is preferably resiliently loaded towards the predetermined optimum control position.

The control plate is preferably resiliently urged into a position where its undersurface is substantially concentric with the rear guide roller of the conveyor. Preferably the control plate is carried by a rod arranged transversely of the machine, and rotatable about its own longitudinal axis, there being a lever fixed to and extending radially from the rod and a tension spring connected at one end to the radially extending lever and anchored at its other end to a fixed part of the machine. The control plate itself preferably extends across the full effective width of the machine, i.e. the width of the conveyor.

According to another preferred feature of the invention, the machine is provided with one or more stationary blades disposed longitudinally of the machine and within the space between the compactor and the top run of the conveyor, the or each blade extending across the major part of the said space, so that the blade is adapted to form a deep incision in a dough piece travelling through the said space, leaving a dough hinge between the portions of the dough on each side of the incision. Preferably the or each blade extends downwardly from the pressure board and the bottom end of the or each blade is spaced from the top run of the conveyor.

In a preferred arrangement, there are three blades, with the centre blade set in advance of the two side blades, whereby three dough hinges are formed to divide the dough piece into four portions which can be folded on each other W-fashion.

According to another preferred feature of the invention, the arrangement of the three blades relatively to the pressure board is such that the two side hinges are disposed approximately diametrically opposite the centre hinge about the longitudinal axis of the dough piece (which is arranged transversely of the machine at the positions where the blades act on the dough piece). This arrangement of the dough hinges facilitates the W formation. However, it is a still further preferred feature of the invention that the the longitudinal setting of the blades relatively to the rear end of the pressure board is such that the rotation of the dough piece (brought about by the presence of the compactor) will bring the two side dough hinges substantially to the rear of the dough piece at the position where the dough piece leaves the pressure board.

Figure 2:
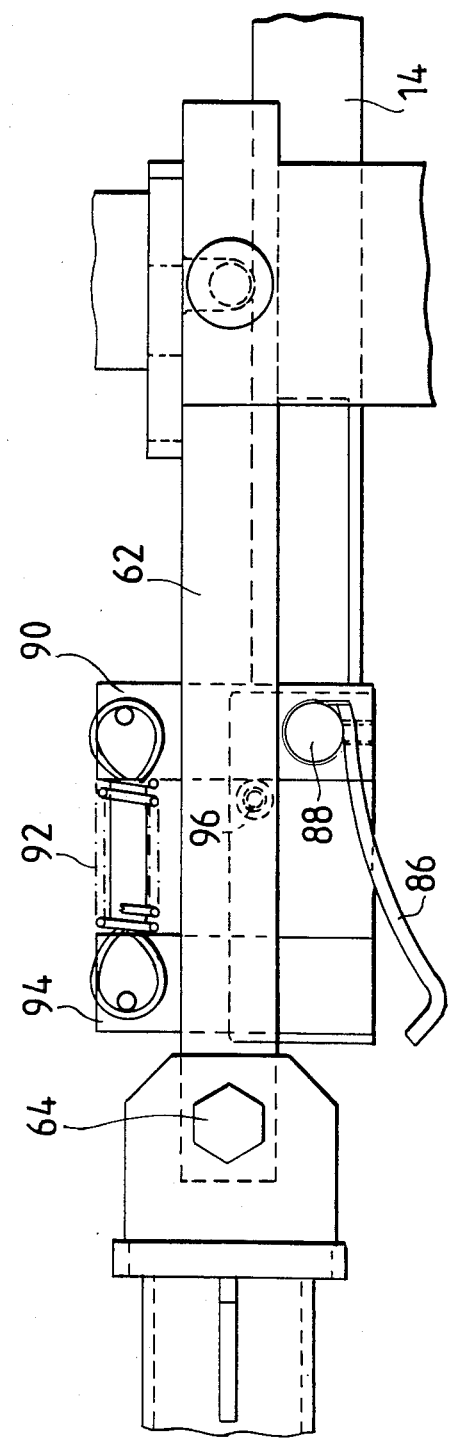
Figures 3, 4:
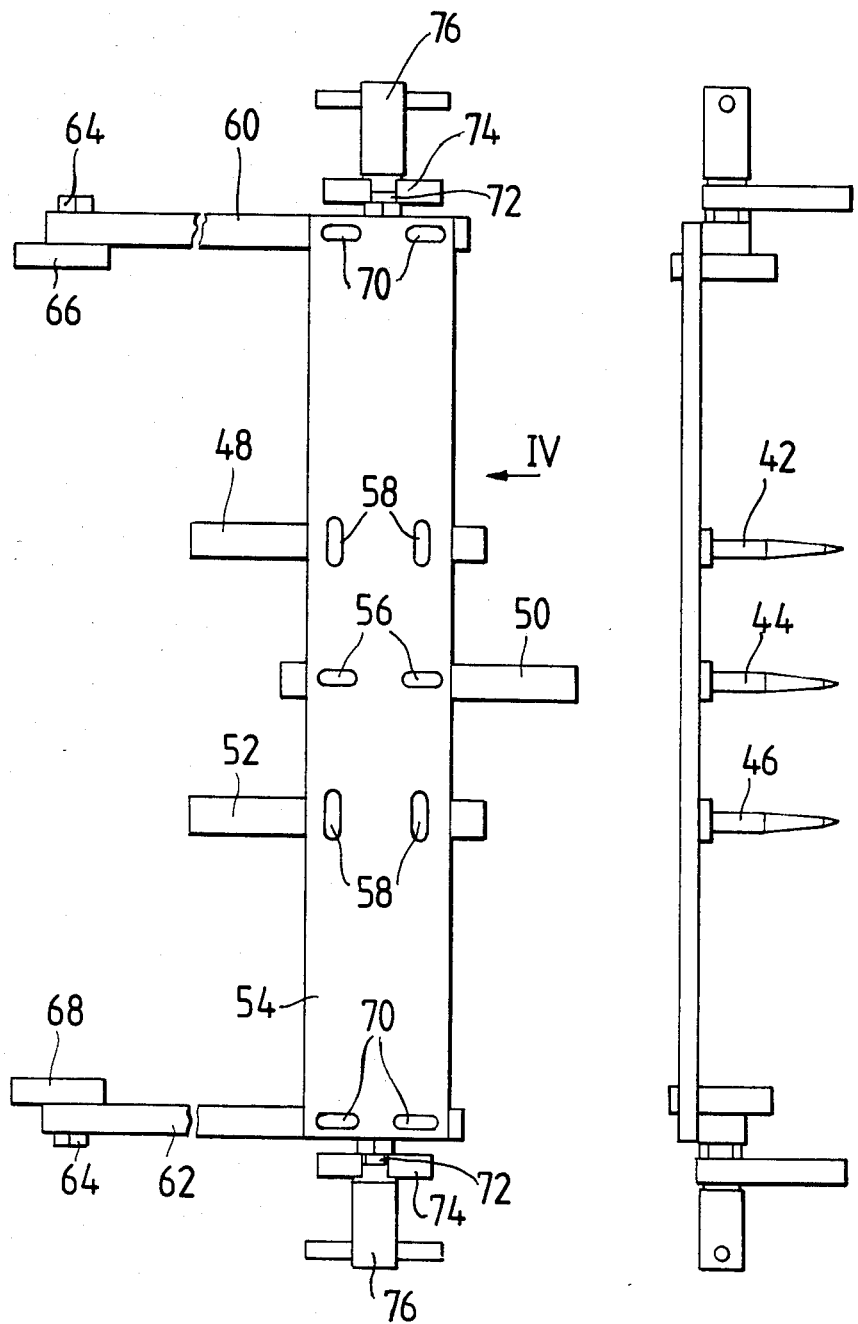
Figure 5:
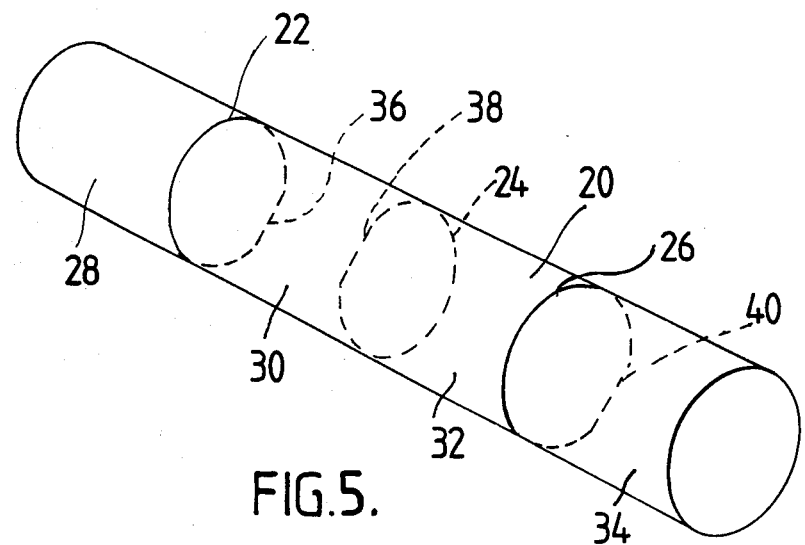
Figure 6:
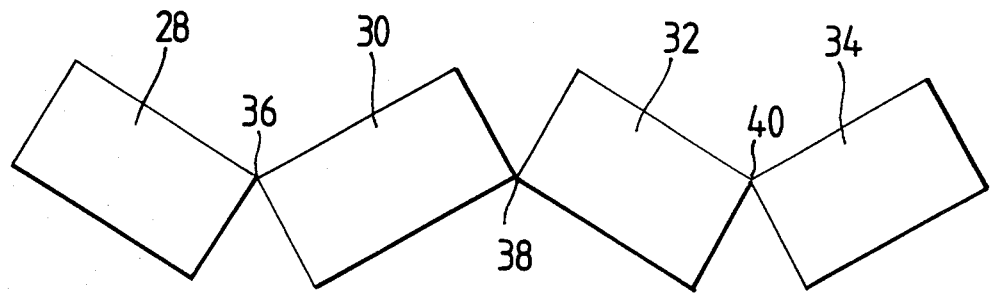

Other features of both aspects of the invention will appear from the following description, given by way of example only, of a bakery moulder/panner and its method of use, and described with reference to the accompanying drawings, in which:

FIG. 1 is a side view of the discharge or panner end of a bakery moulder/panner machine, FIG. 2 is an enlarged detail side view of part of the mechanism illustrated in FIG. 1, FIG. 3 is a plan view of a divider blade board, FIG. 4 is an end view looking in the direction of the arrow IV in FIG. 3, FIG. 5 is a diagrammatic representation of a dough piece following the formation of three dough hinges, and FIG. 6 is a diagram illustrating the W-formation of a dough piece part way through a folding operation.

The apparatus which is illustrated in FIGS. 1 to 4 of the drawings constitutes the discharge or panner end of a moulder/panner, which is generally of conventional construction. Such a moulder/panner has a set of sheeting rollers at the front end of the machine (not shown) which receive pieces of dough divided from a dough mass, and roll out each piece of dough into a flat thin sheet. After leaving the sheeting rollers, the flat sheet of dough is delivered on to the top horizontal run of a conveyor comprising a belt 10 passed around front and rear rollers rotating about horizontal axes, of which only the rear roller 12 is shown in FIG. 1. The conveyor is of appreciable length, and at the front end (not shown) there is a coiler, which usually takes the form of a chain mail sheet draped over the conveyor. As the sheet of dough passes under the chain mail coiler, it is rotated on itself by the ineraction of the forwardly moving top run of the conveyor belt 10, and the stationary chain mail coiler. However, the chain mail coiler only produces a relatively open coiling of the dough sheet. Subsequently to its passage under the chain mail coiler, the roll of dough then passes under a stationary pressure board 14, which extends along the length of the top run of the conveyor belt 10, and is spaced closely above the conveyor. The pressure board 14 extends across the full effective width of the conveyor, and as the loosely rolled piece of dough travels on the conveyor belt, it rolls in contact with the undersurface of the pressure board 14, and this has the effect of tightening or compacting the roll of dough on itself, so that at the discharge end of the conveyor belt, where the dough piece comes out of the nip between the top run of the conveyor belt and the pressure board 14, the dough piece is constituted into a quite tightly rolled cylindrical piece or "sausage". At the exit end of the conveyor, the cylindrical piece of dough has to be delivered into a baking tin, for subsequent conveying to the oven for baking. This is the panner end of the moulder/panner machine, and the present invention relates to the panner or discharge end of the machine.

Quite frequently, a moulder/panner has to be fitted with an arrangement, whereby it is adapted to produce so-called W-folding of the dough piece, and this is illustrated diagrammatically in FIGS. 5 and 6 of the drawings. The dough piece 20 is slit at three equally spaced locations 22, 24 and 26 so that it is divided into four portions 28, 30, 32 and 34 of approximately equal length. The slits 22, 24 and 26 do not extend completely through the cylindrical dough piece, so that effective dough "hinges" 36, 38 and 40 are formed between adjacent portions of dough. It will be observed, particularly from FIG. 6, that whereas the dough hinge 38 is at the front side of the dough piece, the dough hinges 36 and 40 are at the rear side of the dough piece, that is to say, the side hinges 36 and 40 are diametrically opposite to the centre hinge 38, having regard to the cylindrical shape of the entire dough piece.

During its motion through the panner/moulder, the cylindrical dough piece has a translatory motion in a direction at right angles to its own longitudinal axis. If during that motion, the dough piece encounters an obstruction adjacent to the centre hinge 38, then the portions of dough on opposite sides of the centre hinge 38 will fold into a V-formation, with the ends in advance of the centre, and the slit 24 at the centre will open up as shown at the centre of FIG. 6. If subsequently, the end portions 28 and 34 encounter obstructions, then they will be retarded in their translational forward motion, and the slits 22 and 26 will open up, so that the four dough portions 28, 30, 32 and 34 adopt a W-formation as illustrated in FIG. 6. It will be appreciated, that if the dough piece moves forward from the position illustrated in FIG. 6, whilst there is still an obstruction at the centre in engagement with the hinge 38, and inwardly directed compressive forces are applied to the end portions 28 and 34, then eventually, the four dough portions 28, 30, 32 and 34 will be turned so that they lie with their individual longitudinal axes parallel to each other, and extending in the direction of translational forward motion. Further compressive force applied to the ends of the dough piece will cause these four portions to be squashed together, and effectively united. However, by turning the four dough portions through 90° during the forward motion, the grain of the coiled dough piece which previously extended transversely of the machine, will now extend longitudinally of the machine, in four separate regions of the complete dough piece.

The method of slitting and folding the dough illustrated in FIGS. 5 and 6, and described above, is conventional, and is referred to as W folding. It is in fact quite frequently used in the manufacture of loaves, because it has proved advantageous to divide the single "sausage" of dough into four portions, and then turn them through 90° as described. Part of the mechanism at the panner end of the moulder/panner machine is provided for the purpose of W folding.

It will be noted by reference to FIG. 1, that the pressure board 14 extends at its rear end to a position over the rear roller 12 of the conveyor. In fact, as illustrated, it extends to a position just beyond the vertical plane passing through the axis of the roller 12. This is an extension beyond what is conventional with pressure boards 14, which normally terminate over the horizontal top run of the conveyor belt 10.

Three longitudinally extending slots are formed in the rear end of the pressure board 14, at laterally spaced positions, where slitting blades 42, 44 and 46 are to be employed for the purpose of creating the slits 22, 24 and 26 in dough pieces passing through the moulder/panner. As illustrated in FIGS. 3 and 4, each of the slitting blades 42, 44 and 46 depends from a flange 48, 50 and 52, and these flanges are secured by bolts (not shown) to a blade mounting plate 54, which extends across the full width of the machine. As is clear from FIG. 3, the bolts which secure the centre blade 44 to the mounting plate 54 pass through longitudinally elongated slots 56, which permit some longitudinal adjustment of the position of the centre blade 44. Because this blade always has to engage with the dough piece midway along the length of the dough piece, there is no need to provide for lateral adjustment. On the other hand, each of the blades 42 and 46 is connected to the mounting plate 54 through transversely elongated holes 58, which permit some lateral adjustment of the side blades 42 and 46. In practice, by adjusting the lateral location of the side blades 42 and 46, it is possible to vary the length of the portions 30 and 32 of the dough piece. Varying the longitudinal position of the centre blade 44 is mainly a question of altering the relationship between the position at which the rear end of that blade 44 engages with the dough piece, and the position at which the side blades 42 and 46 engage with the dough piece. In fact, the blades 42, 44 and 46 have to be set relatively to each other so that the dough hinge 38 is diametrically opposite the dough hinges 36 and 40. It will be recalled, that the cylindrical dough piece is turning as it moves forwardly on the top run of the conveyor belt 10, and therefore the longitudinal distance between the rear end of the blade 44 and the rear ends of the blades 42 and 46 should be set approximately equal to half the circumferantial length of the dough piece, in order to produce the desired effect of arranging the hinge 38 diametrically opposed to the hinges 36 and 40. Practical experience may show that this distance has to be varied slightly from the theoretically correct distance to allow for slipping of the dough piece.

The slitting blade mounting plate 54 is carried by a pair of arms 60 and 62, each of which is pivoted on axially aligned pivots 64, provided on fixed parts 66 and 68 of the machine frame. The mounting plate 54 is attached to the arms 60 and 64 by bolts (not shown) which pass through longitudinally elongated slots 70, so that it is possible to adjust the entire slitting blade arrangement longitudinally of the machine.

Each of the arms 60 and 62 carries a projecting stud 72 which can be engaged in a slot in a fixed frame member 74, when the mounting plate 54 is in a lowered position, which is the operative position illustrated in FIG. 1. In this operative position, the mounting plate 54 can be locked by turning locking nuts 76, which clamp on the stationary side members 74. When the locking nuts 76 are released, the entire mounting plate 54 with the blades attached to it can be lifted upwardly by turning it about its pivots 64, to lift the slitting blades 42, 44 and 46 away from the pressure board 14. This is permissible, because the blades 42, 44 and 46 extend downwardly through the slots in the pressure board 14, when the mounting plate 54 is in the lowered operative position. Hence, one can obtain easy access to the slitting blades for the purpose of cleaning, adjusting or replacing those blades.

To the rear of the conveyor, there is a fluidised bed arrangement 78 (see FIG. 1) which comprises a surface plate 80 carried by a plenum chamber 82. The plate 80 extends across the effective width of the machine, and is inclined downwardly and rearwardly as clearly shown in FIG. 1. Furthermore, at its upper front end, it lies closely adjacent to the surface of the belt 10, where the belt passes around the rear guide roller 12. A series of small holes is formed in the inclined plate 80, and these holes are arranged in ranks and files, so as to cover the entire effective area of the plate 80. In a typical arrangement, the holes may be each 0.062 inches diameter, and evenly spaced from each other at approximately half inch centres, in both the longitudinal and lateral directions. A compressor (not shown) is connected to the plenum chamber 78, for the purpose of supplying air under pressure to the plenum chamber. Consequently, the air from the compressor has to escape from the plenum chamber through the multiplicity of small holes in the surface plate 80. This provides a typical fluidised bed arrangement, because when a dough piece falling from the conveyor arrives on the inclined plate 80, the air streams issuing from the plate under the dough piece unite to form a film of air on which the dough piece floats. It will be appreciated, that in any case, the dough piece will tend to slide down the surface plate 80, but with very soft doughs, there is sometimes a tendency for the dough piece to stick on any guide plate provided, and in any case, a soft dough piece can easily be deformed by impact on the plate. However, the fluidised bed arrangement, by preventing physical engagement between the dough piece and the plate, prevents the dough piece sticking to the plate, and also minimises the danger of deformation due to impact. The lower end of the guide plate 80 is arranged adjacent to a discharge roller 84 which is arranged on the underside of the panner, above the position at which the baking tins (not shown) are presented one at a time to receive the dough pieces discharged from the moulder/panner. This roller 84 is rotated slowly by means not illustrated.

A guide plate 86 made of sheet steel is provided adjacent to the rear end of the pressure board 14, and this plate 86 is located over the path of the conveyor belt 10, as it descends around part of the periphery of the rear guide roller 12. The plate 86 extends across the effective width of the machine, and is secured at its forward end to a rod 88, which also extends across the width of the machine, and which is journalled in bearings (not shown) at each side of the machine, so that it is possible to turn the plate 86 about the longitudinal axis of the rod 88. A lever 90 is keyed on to the rod 88, and one end of a tension spring 92 is attached to the lever 90, the other end of the tension spring 92 being achored on an upright member 94 which forms part of the fixed framework of the machine. Consequently, the guide plate 86 can be tilted away from the rear guide roller 12, by turning it about the axis of the rod 88, but this movement is resisted by the tension spring 92, which will always attempt to turn the guide plate 86 back into the position illustrated in FIGS. 1 and 2, where the lever 90 engages with a fixed stop 96.

The curvature of the guide plate 86 is such, that in the ordinary operative position, illustrated in FIGS. 1 and 2, it is substantially concentric with the guide roller 12, and therefore with the path of the conveyor belt 10 passing over the guide roller. Moreover, the gap between the belt 10 and the underside of the guide plate 86 is approximately equal to the depth of the gap between the upper run of the conveyor belt 10 and the underside of the pressure plate 14. Hence, when a dough piece in cylindrical form is emerging from the gap between the conveyor and the pressure board, it engages with the underside of the guide plate 86, which therefore forms an effective extension of the pressure board, at least so far as the guiding and controlling effect of the pressure board is concerned. Therefore, the guide plate 86 holds the dough piece during the critical period when it is out of the control of the pressure board, and is moving from a horizontal path into a downwardly sloping path and produces a continued turning of the dough piece about its own longitudinal axis whilst the dough piece is passing in engagement with the guide plate. At the same time, the resilient loading of the guide plate 86 by means of the tension spring 92 will allow the plate to yield slightly if necessary, to allow the dough piece to pass without applying a force to the dough piece sufficient to cause distortion.

A central retarding disc 98 is carried by a pneumatic cylinder 100 fixed on the machine frame, and adapted to project the retarding disc 98 into the position shown in FIG. 1, but to permit upward withdrawal of the retarding disc 98 away from the surface plate 80 if required. The disc 98 forms a first part of a folding apparatus and its purpose is to engage with the dough piece as it begins to slide over the fluidised bed 78, in the region of the central dough hinge 38, thereby retarding the dough piece at the centre, and causing the dough piece to bend into a V-formation.

At each side of the fluidised bed 78, there is a stationary manipulator 102 which also forms part of the folding apparatus. Each of these manipulators has an inner wall, which is perpendicular to the surface plate 80, but inclined inwardly and downwardly. In other words, the inner walls of the two manipulators 102 converge towards the bottom end of the manipulators. The lateral position of the manipulators 102 is such that they engage with the ends of the dough piece, as the latter is sliding over the fluidised bed 78, and retard the end portions 28 and 34, so that in combination with the central retarding disc 98, they produce the W-formation of the dough piece. The arrangement is such, that the formation of the W commences at the top of the manipulators 102, and by the time the dough piece is passing out through the bottom ends of the manipulators, its four portions 28, 30, 32 and 34 are inclined to each other at quite acute angles—i.e. each dough piece has been turned through the major part of 90°.

In some instances, each of the manipulators 102 may itself take the form of a fluidised bed, with the inclined inner wall being perforated to provide a fluidised surface for "engagement" with the dough piece. In that case, the manipulator 102 will be of box-like form, and the box will in fact be the plenum chamber of the fluidised bed arrangement. If the manipulators 102 are fluidised, then they can be connected to the same source of air under pressure as that used for the fluidised bed 78.

Finally, the particular folding mechanism illustrated includes a pair of rotary manipulators 106 positioned beyond the exit from the stationary manipulators 102, and over the discharge roller 84. Each of the rotary manipulators 106 takes the form of a roller, mounted for rotation about an axis which is substantially perpendicular to the surface plate 80, and each of the rotary manipulators 106 is driven by a geared electric motor 108. In fact, each sub assembly comprising one of the rotary manipulators 106 together with its driving motor 108 and the reduction gearing between the motor and the rotary manipulator, is mounted for adjustment about an axis 110. The purpose of the rotary manipulators is to squeeze the four small dough pieces together to complete the folding process, and to guide it on to a discharge roller 84. Thus, there is almost complete control of the dough piece at all times during its passage from the exit end of the pressure board 14, to the position where it is discharged into a baking tin.

It will be recalled that the blades 42, 44 and 46 are so arranged that the centre dough hinge 38 is angularly displaced by approximately 180° from the two hinges 36 and 40. When the dough piece leaves the blades 42 and 46, the hinges 36 and 40 will be at the leading side of the dough piece and the hinge 38 will be at the trailing side. This is just the opposite of the orientation required when the dough piece arrives at the folding station where it encounters first the disc 98 and then the side manipulators 102. However, after it has left the blades, the dough piece continues to turn about its own longitudinal axis and the length of the guide plate 86 is made such that the dough piece turns through approximately 180° as it passes in engagement with the guide plate. In this way, the dough piece is given the desired orientation when it is presented to the dough folding apparatus. Theoretically, since it is required to rotate the dough piece through approximately 180°, the circumferential length of the undersurface of the guide plate 86 should be equal to half the circumference of a typical dough piece "cylinder". In practice, it will be possible to determine the exact length of the guide plate by trial and error. Also, small adjustments in the angular turning of the dough piece may be effected by varying the tension in the spring 92.

I claim:

1. A bakery dough molding machine having a conveyor for carrying dough pieces each having a longitudinal axis, toward a discharge end of the machine; at least one blade for making an incision in each of said dough pieces as it travels on said conveyor, to form at least one dough hinge in the dough piece; a moving element for conveying the dough piece after it have been engaged by said at least one blade, to a dough folding station; and a stationary control member, disposed over the path of movement of said moving element, said control member having a control surface for engaging the dough piece as said dough piece is moving on the moving element, the length of the control surface being such that the dough piece is caused to turn through an angle about said longitudinal axis such that each dough hinge is presented at the folding station in a desired orientation.

2. A bakery dough moulder as claimed in claim 1, in which the moving element comprises a roller.

3. A bakery dough moulder as claimed in claim 1, in which the moving element comprises a part of the conveyor which passes over a roller.

4. A bakery dough moulder as claimed in claim 2, in which the roller is a guide roller for the conveyor at the discharge end of the conveyor.

5. A bakery dough moulder as claimed in claim 2, in which the stationary control member comprises a control plate located above the guide roller and curved about an axis parallel with and either co-axial with or adjacent to the axis of the guide roller, to form a curved nip between the guide roller or part of the conveyor belt passing over the guide roller and the underside of the control plate.

6. A bakery dough moulder as claimed in claim 5, in which the control plate is resiliently loaded towards the predetermined optimum control position.

7. A bakery dough moulder as claimed in claim 5, which includes a compactor arranged over the top run of the conveyor for tightening the dough roll on itself as it travels on the conveyor and under the compactor towards the folding station, in which there are three stationary blades disposed longitudinally of the machine and within the space between the compactor and the top run of the conveyor, each blade extending across the major portion of the said space, so that it is adapted to form a deep incision in a dough piece travelling through the said space, the centre blade being set in advance of the two side blades, whereby three dough hinges are formed to divide the dough piece into four portions which can be folded on each other W-fashion.

8. A bakery dough moulder as claimed in claim 7, in which the arrangement of the three blades relatively to the compactor is such that the two side hinges are disposed approximately diametrically opposite the centre hinge about the longitudinal axis of the dough piece (which is arranged transversely of the machine at the positions where the blades act on the dough piece).

9. A bakery dough moulder as claimed in claim 8, in which the longitudinal setting of the blades relatively to the rear end of the compactor is such that the rotation of the dough piece (brought about by the presence of the compactor) will bring the two side dough hinges substantially to the rear of the dough piece at the position where the dough piece leaves the compactor.

* * * * *